United States Patent
Saw et al.

(10) Patent No.: US 10,346,331 B2
(45) Date of Patent: Jul. 9, 2019

(54) METHOD AND APPARATUS FOR DATA DETECTION AND EVENT CAPTURE

(71) Applicant: ALTERA CORPORATION, San Jose, CA (US)

(72) Inventors: Si Xing Saw, Bukit Mertajam (MY); Seng Kuan Yeow, Pokok Sena (MY); Kang Syn Ting, Bayan Lepas (MY)

(73) Assignee: Altera Corporation, San Jose, CA (US)

( * ) Notice: Subject to any disclaimer, the term of this patent is extended or adjusted under 35 U.S.C. 154(b) by 236 days.

(21) Appl. No.: 15/193,654

(22) Filed: Jun. 27, 2016

(65) Prior Publication Data

US 2017/0371818 A1     Dec. 28, 2017

(51) Int. Cl.
  *G06F 13/36*     (2006.01)
  *H04L 7/00*      (2006.01)
  *G06F 13/362*    (2006.01)
  *G06F 13/22*     (2006.01)

(52) U.S. Cl.
  CPC ............ *G06F 13/362* (2013.01); *G06F 13/22* (2013.01)

(58) Field of Classification Search
  None
  See application file for complete search history.

(56) References Cited

U.S. PATENT DOCUMENTS

| | | | |
|---|---|---|---|
| 4,816,820 A * | 3/1989 | Davis ................. | H04L 25/0262 340/7.41 |
| 5,699,441 A * | 12/1997 | Sagawa ............... | G06F 17/2872 382/100 |
| 6,377,645 B1 * | 4/2002 | Chen .................... | H04J 3/0608 370/235 |
| 6,502,169 B1 | 12/2002 | Noya et al. | |
| 6,711,131 B1 | 3/2004 | Shiobara | |
| 7,839,795 B2 | 11/2010 | Felkar et al. | |
| 7,978,772 B2 | 7/2011 | Koga et al. | |
| 8,331,395 B2 | 12/2012 | Koga et al. | |
| 8,780,933 B2 | 7/2014 | Schmitz et al. | |
| 2003/0147425 A1 | 8/2003 | Annadurai et al. | |
| 2005/0152461 A1 * | 7/2005 | Okazaki ............. | G11B 20/1426 375/259 |
| 2005/0154858 A1 | 7/2005 | Kravec et al. | |
| 2006/0077829 A1 * | 4/2006 | Kadokawa .......... | G11B 7/0053 369/47.28 |

(Continued)

FOREIGN PATENT DOCUMENTS

JP    2002-290421 A    10/2002

*Primary Examiner* — Hyun Nam
(74) *Attorney, Agent, or Firm* — Compass IP Law PC

(57) ABSTRACT

One embodiment relates to a data detection and event capture circuit. Data comparator logic receives a monitored data word from a parallel data bus and generates a plurality of pattern detected signals. Any pattern detection logic receives the plurality of pattern detected signals and generates a plurality of any pattern detected signals. Sequence detection logic receives the plurality of pattern detected signals and generates a plurality of sequence detected signals. Another embodiment relates to a method of data detection and event capture. Another embodiment relates to an integrated circuit having a first data detection and event capture circuit in a receiver circuit and a second data detection and event capture circuit in a transmitter circuit. Other embodiments and features are also disclosed.

19 Claims, 11 Drawing Sheets

DDEC Logic 100

(56) References Cited

U.S. PATENT DOCUMENTS

| | | | |
|---|---|---|---|
| 2007/0103805 A1* | 5/2007 | Hayashi | G11B 20/10009 360/39 |
| 2008/0192871 A1* | 8/2008 | Foley | H04J 3/0685 375/354 |
| 2014/0258795 A1* | 9/2014 | Schnizler | H04L 1/241 714/705 |
| 2017/0353335 A1* | 12/2017 | Mendel | H04L 43/087 |

* cited by examiner

METHOD AND APPARATUS FOR DATA DETECTION AND EVENT CAPTURE

BACKGROUND

Technical Field

The present invention relates generally to data communications and integrated circuits.

Description of the Background Art

High-speed data links are used to communicate data between devices in a system. High-speed serial interface (HSSI) protocols have been developed at increasingly fast data rates for such high-speed data links.

SUMMARY

The present disclosure provides an innovative method and apparatus for monitoring data being sent and/or received by a HSSI transmitter and/or receiver. The method and apparatus allows a user to monitor the data communications so as to detect specific data and provide a precise event signal for a time-aware application.

One embodiment relates to a data detection and event capture circuit. Data comparator logic receives a monitored data word from a parallel data bus and generates a plurality of pattern detected signals. Any pattern detection logic receives the plurality of pattern detected signals and generates a plurality of any pattern detected signals. Sequence detection logic receives the plurality of pattern detected signals and generates a plurality of sequence detected signals.

Another embodiment relates to a method of data detection and event capture. A monitored data word is received from a parallel data bus. Data comparator logic is applied to the monitored data word to generate a plurality of pattern detected signals. Any pattern detection logic is applied to the plurality of pattern detected signals to generate a plurality of any pattern detected signals, and sequence detection logic is applied to the plurality of pattern detected signals to generate a plurality of sequence detected signals.

Another embodiment relates to an integrated circuit that includes a first data detection and event capture circuit in a receiver circuit. In addition, the integrated circuit includes a second data detection and event capture circuit in a transmitter circuit.

Other embodiments and features are also disclosed.

DETAILED DESCRIPTION

The present disclosure provides a flexible circuit structure that allows user logic to monitor data being sent/received by a high-speed serial interface. Both data detection and event capture functionalities are enabled by the circuit structure.

Figure 1:
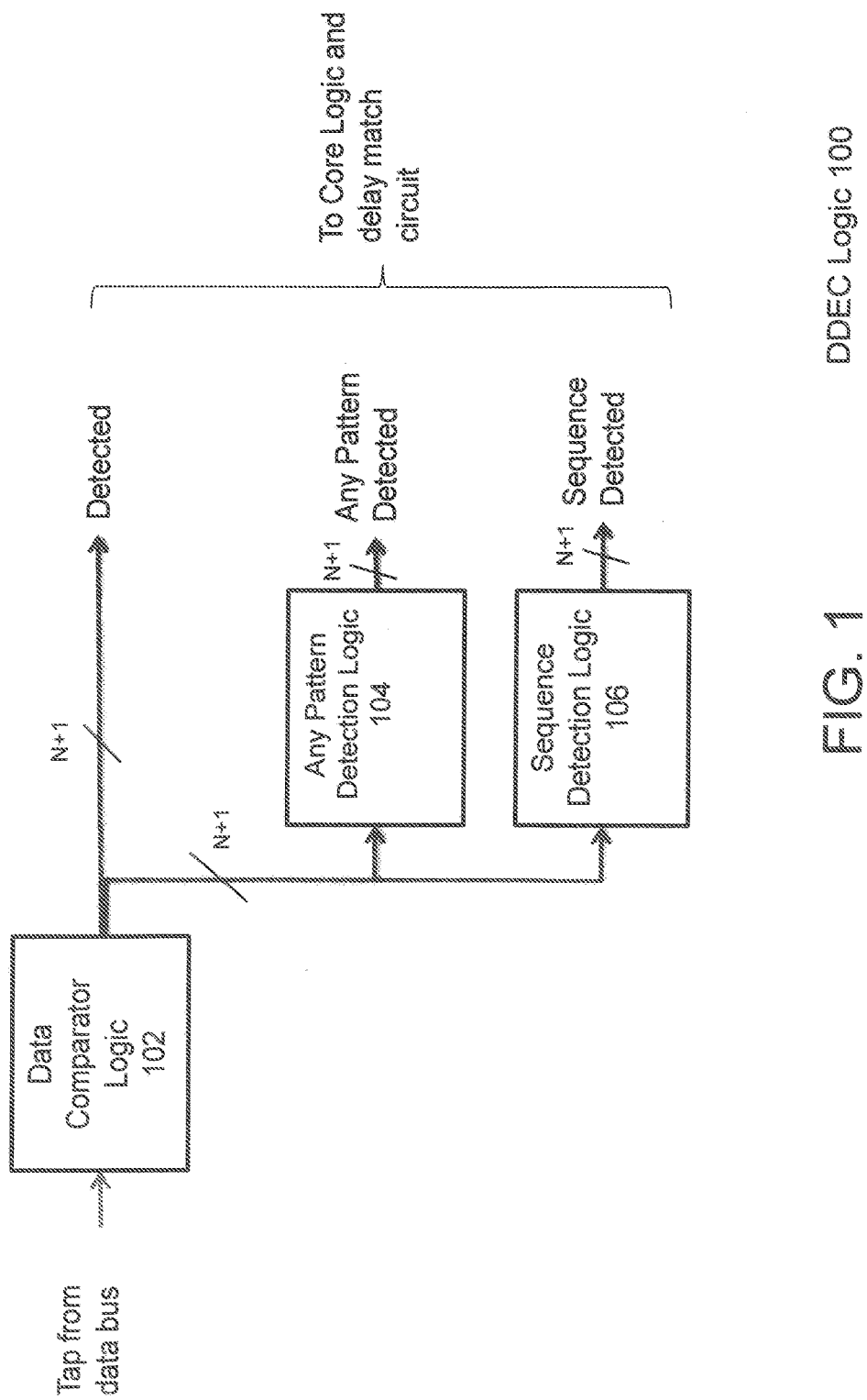
FIG. 1 depicts a circuit structure for data detection and event capture logic in accordance with an embodiment of the invention.

FIG. 1 depicts a circuit structure for data detection and event capture logic (DDEC Logic 100) in accordance with an embodiment of the invention. As shown, the DDEC Logic 100 may include data comparator logic 102, any pattern detection logic 104 and sequence detection logic 106. The any pattern detection logic 104 determines whether any pattern in each of a plurality of sets of patterns is detected. The patterns in each set of patterns are configurable. The sequence detection logic 106 determines whether any pattern sequence in each of a plurality of sets of pattern sequences is detected. The pattern sequences and their order in each set of pattern sequences are configurable.

The data comparator logic 102 receives a data signal via a tap from a data bus. The data bus that is tapped may be, for example, in a receiver PCS (physical coding sublayer) circuit, or a transmitter PCS circuit. The data comparator logic 102 may output N+1 pattern detected signals (Detected). As indicated in FIG. 1, the N+1 pattern detected signals may be output to core logic and a delay match circuit. In addition, the N+1 pattern detected signals may be output to the any pattern detection logic 104 and the sequence detection logic 106.

The any pattern detection logic 104 receives the N+1 pattern detected signals. The any pattern detect logic applies mask logic and OR logic to the N+1 pattern detected signals to generate N+1 any pattern detected signals. The N+1 any pattern detected signals may be output to the core logic and the delay match circuit.

The sequence detection logic 106 receives the N+1 pattern detected signals. The sequence detection logic applies mask logic and AND logic to the N+1 pattern detected signals to generate N+1 sequence detected signals. The N+1 sequence detected signals may be output to the core logic and the delay match circuit.

Figure 2:
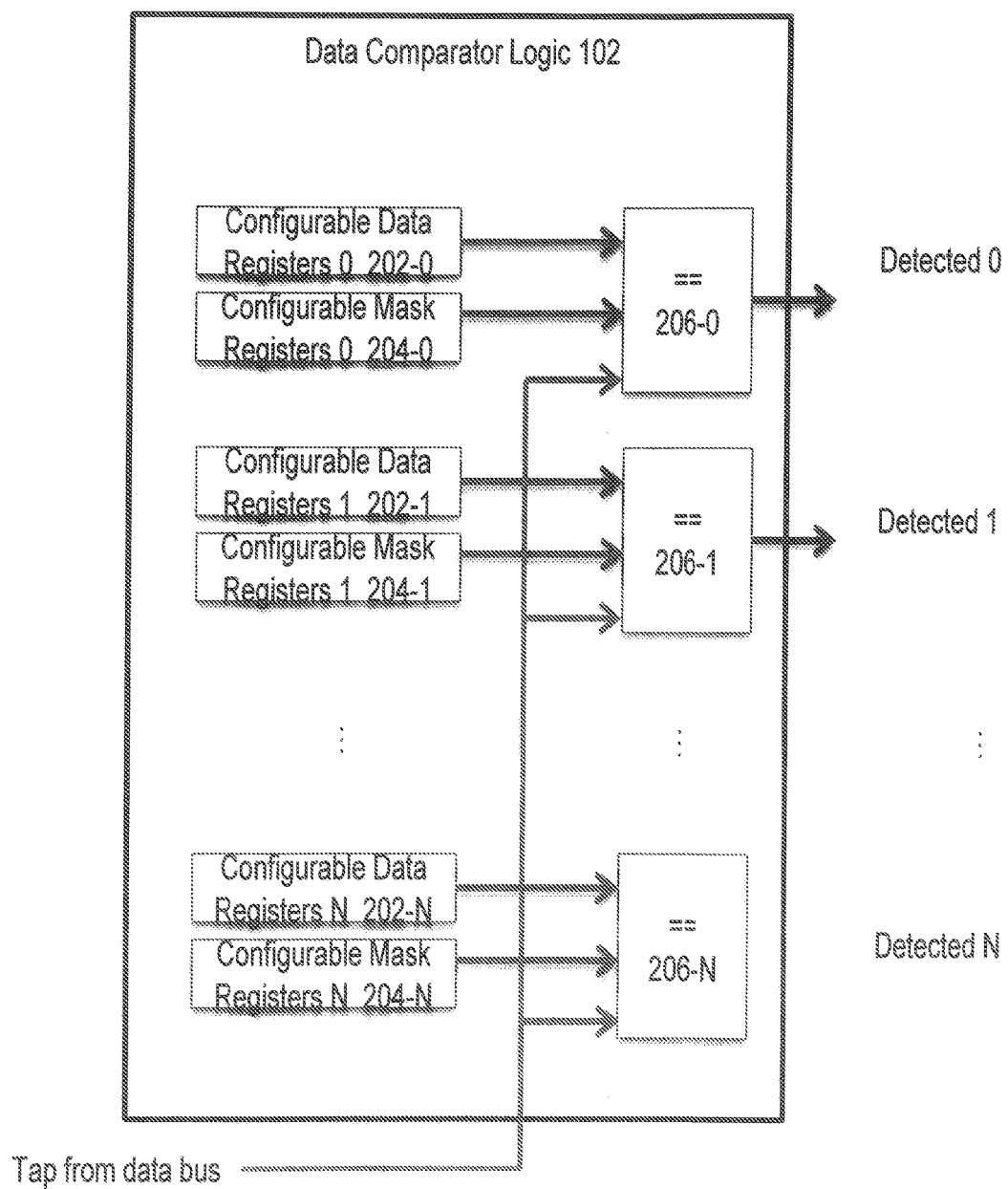
FIG. 2 depicts data comparator logic in accordance with an embodiment of the invention.

FIG. 2 depicts data comparator logic 102 in accordance with an embodiment of the invention. The data comparator logic 102 includes N+1 pairs of registers (n=0, 1, 2, . . . , N−1, and N for the N+1 pairs).

Each pair of registers (202-*n* and 204-*n*) includes a configurable data register 202-*n* holding a configured data word and a configurable mask register 204-n holding a configured mask word, and the configured data word and the configured mask word may be output to a corresponding comparator circuit 206-n. Each comparator circuit 206-n may include a monitored data register that receives a word of the monitored data via the tap from the data bus. For example, if the tapped data bus is 10-bits wide, then the monitored data word, the configured data word, and the configured mask word may each be 10-bits wide.

Each comparator circuit 206-n makes a comparison between the configured data word and the monitored data word received from the data bus tap. The comparison may be done only for bits indicated by the configured mask word. For example, the comparison may be done only for those bits with a value of logical 1 in the configured mask word.

If the comparison indicates a pattern match between the bits of the configured data word and the monitored data word (for those bits indicated by the configured mask word), then the match is indicated by the Detected n signal that is generated and output by the comparator circuit 206-n. For example, a logical 1 value for the Detected n signal may indicate a match, while a logical 0 for the Detected n signal may indicate no match.

Figure 3:
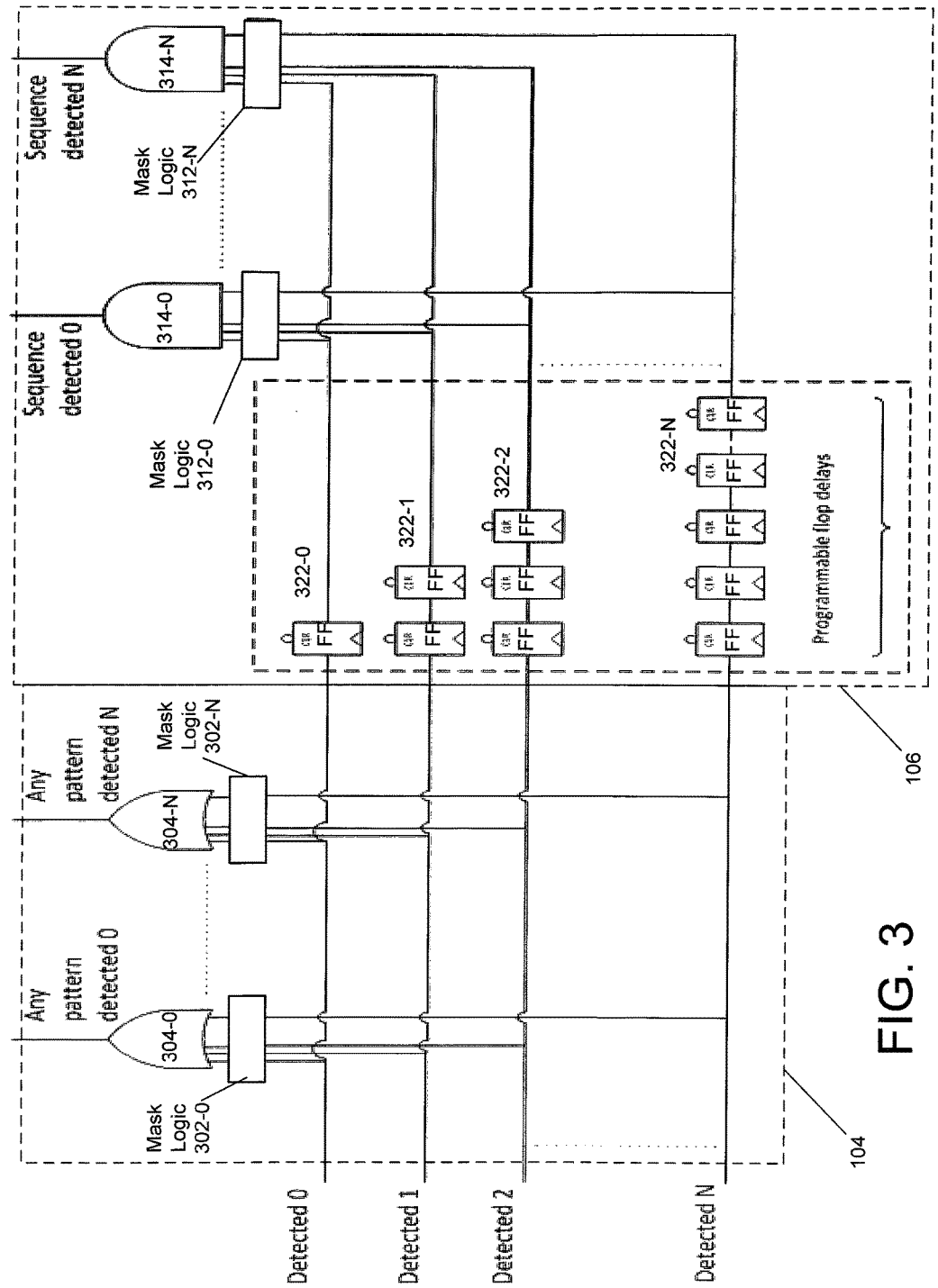
FIG. 3 depicts any pattern detection logic and sequence detection logic in accordance with an embodiment of the invention.

FIG. 3 depicts any pattern detection logic 104 and sequence detection logic 106 in accordance with an embodiment of the invention. As depicted, the any pattern detection logic 104 and the sequence detection logic 106 may each receive the N+1 Detected n signals output by the data comparator logic 102.

The any pattern detection logic 104 may include N+1 "any pattern detected" circuits that each receive the N+1 Detected n signals and output an any pattern detected n signal. Each any pattern detected circuit includes an N+1 input mask logic circuit 302-n and an N+1 input OR logic circuit 304-n.

Each mask logic circuit 302-n is configured with an N+1 bit mask. The N+1 bit mask indicates which of the N+1 Detected n signals are relevant for that any pattern detected circuit. Each mask logic circuit 302-n may perform a logical AND operation between each mask bit and its corresponding Detected signal. For example, mask logic circuit 302-n may hold 8 bits (N=7) that are 00001111. In this example, only the Detected 4, Detected 5, Detected 6 and Detected 7 signals are relevant in generating the any pattern detected n signal. The Detected 0, Detected 1, Detected 2 and Detected 3 signals are made irrelevant by outputting a value of logical 0 for bits 0 to 3 of the output of mask logic circuit 302-n (regardless of the values of the Detected 0, Detected 1, Detected 2 and Detected 3 signals). Meanwhile, the Detected 4, Detected 5, Detected 6 and Detected 7 signals are made relevant by passing through their values as bits 4 to 7 of the output of mask logic circuit 302-n.

Each OR logic circuit 304-n receives the N+1 bit output (the masked pattern detected signals) of the corresponding mask logic circuit 302-n. If any of the bits received from mask logic circuit 302-n is logical 1, then the OR logic circuit 304-n outputs a logical 1 as the any pattern detected n signal (indicating at least one pattern was detected). On the other hand, if all the bits received from mask logic circuit 302-n are logical 0, then the OR logic circuit 304-n outputs a logical 0 as the any pattern detected n signal (indicating no pattern was detected).

The sequence detection logic 106 may include N+1 programmable flop delays 322-n and N+1 sequence detected circuits. Each sequence detected circuit including a mask logic circuit 312-n and an AND logic circuit 314-n.

Each flop delay circuit 322-n receives a corresponding Detected n signal, and delays that signal by up to a maximum of M (parallel) clock cycles. The number of cycles of delay is programmable. In the illustrated example, flop delay circuit 322-0 delays the Detected 0 signal by one clock cycle, flop delay circuit 322-1 delays the Detected 1 signal by two clock cycles, flop delay circuit 322-2 delays the Detected 2 signal by three clock cycles, . . . , and flop delay circuit 322-N delays the Detected N signal by 5 clock cycles. The N+1 delayed Detected n signals output by the N+1 flop delay circuits 322-n provided to each mask logic circuit 312-n.

Each mask logic circuit 312-n is configured with an N+1 bit mask. The N+1 bit mask indicates which of the N+1 delayed Detected n signals are relevant for that sequence detected circuit. Each mask logic circuit 312-n may perform a logical OR operation between each mask bit and its corresponding Detected signal. For example, mask logic circuit 302-n may hold 8 bits (N=7) that are 00111111. In this example, only the delayed Detected 0 and delayed Detected 1 signals are relevant in generating the sequence detected n signal. The delayed Detected 2, delayed Detected 3, delayed Detected 4, delayed Detected 5, delayed Detected 6 and delayed Detected 7 signals are made irrelevant by outputting a value of logical 1 for bits 2 to 7 of the output of mask logic circuit 312-n (regardless of the values of the delayed Detected 2, delayed Detected 3, delayed Detected 4, delayed Detected 5, delayed Detected 6 and delayed Detected 7 signals). Meanwhile, the delayed Detected 0 and delayed Detected 1 signals are made relevant by passing through their values as bits 0 and 1 of the output of mask logic circuit 312-n.

Each AND logic circuit 314-n receives the N+1 bit output of the corresponding mask logic circuit 312-n. If all of the bits received from mask logic circuit 312-n are logical 1, then the AND logic circuit 314-n outputs a logical 1 as the sequence detected n signal (indicating that the specified sequence of patterns was detected). On the other hand, if at least one of the bits received from mask logic circuit 312-n is logical 0, then the AND logic circuit 314-n outputs a logical 0 as the sequence detected n signal (indicating that the specified sequence of patterns was not detected).

Figure 4:
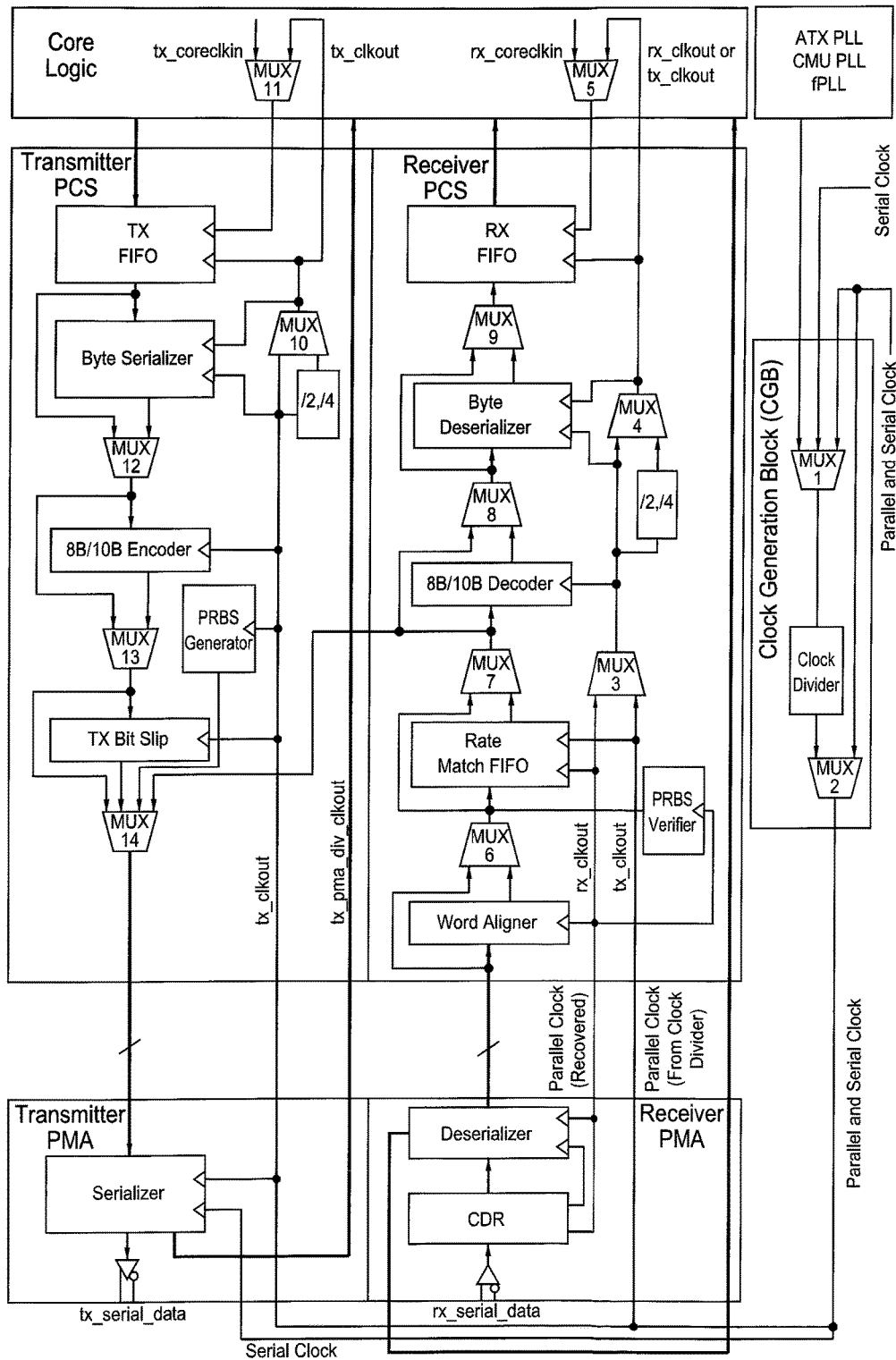
FIG. 4 depicts exemplary transmitter and receiver circuits of a programmable logic device in accordance with an embodiment of the invention.

FIG. 4 depicts exemplary transmitter and receiver circuits of a programmable logic device in accordance with an embodiment of the invention. The specific structures of the transmitter and receiver circuits shown are exemplary structures with which the DDEC logic 100 may be utilized. The DDEC logic 100 may be similarly utilized with transmitter and receiver circuits having other specific structures.

The specific circuits illustrated in FIG. 4 include a clock generation block (CGB), a receiver physical media attachment (PMA) circuit, a receiver physical coding sublayer (PCS) circuit, core logic of the integrated circuit, a transmitter PCS circuit, and a transmitter PMA circuit. Note that the exemplary transmitter and receiver PCS circuits shown in FIG. 4 are designed to be flexibly configured so as to accommodate a wide variety of HSSI protocols.

The CGB receives serial clock outputs from various phase locked loops (ATX PLL, CMU PLL, and fPLL) and may receive other serial clocks. The multiplexer MUX 1 is controlled to select one of the serial clocks and divides it by a clock divider circuit. The multiplexer MUX 2 is controlled to receive the output of the clock divider circuit and also to receive other parallel and serial clocks. The output of MUX 2 may be the parallel clock (tx_clkout) from the clock divider and a serial clock. The parallel clock (tx_clkout) may be provided to the transmitter and receiver circuits, and the serial clock may be provided to the serializer of the transmitter PMA circuit.

The receiver PMA circuit receives a serial data signal (rx_serial_data) from the serial communication channel and provides the serial data signal to a clock data recover (CDR) circuit. The CDR circuit provides recovered serial clock and data signals to a deserializer. The CDR also provides a recovered parallel clock (rx_clkout) to the deserializer and the receiver PCS circuit. The deserializer outputs a parallel data signal to the receiver PCS circuit and also outputs parallel and serial clock signals (rx_pma_div_clkout) to the core logic.

In the receiver PCS circuit, the parallel data signal from the deserializer is provided to the word aligner and also to bypass MUX 6. The word aligner also receives the recovered parallel clock signal and outputs an aligned word signal to bypass MUX 6. Bypass MUX 6 selects either the aligned word signal or the recovered parallel data signal (bypassing the word aligner in the latter case).

The parallel data signal output from MUX 6 is provided to the rate match FIFO buffer, bypass MUX 7, and a PRBS (pseudo random binary sequence) verifier. The rate match FIFO buffer also receives rx_clkout and tx_clkout and compensates for the frequency difference between them. Bypass MUX 7 selects the parallel data signal either with or without rate matching (bypassing the rate match FIFO in the latter case).

The parallel data signal output by MUX 7 is provided to the 8 b/10 b decoder, bypass MUX 8 and the transmitter PCS circuit. The 8 b/10 b decoder maps 10-bit symbols to 8-bit symbols (and may be clocked by a parallel clock signal provided by MUX 3, which selects either rx_clkout or tx_clkout). Other decoders may be used depending on the encoding system utilized. For example, 64 b/66 b decoder may be used. Bypass MUX 8 selects the parallel data signal either after or before decoding (bypassing the decoder in the latter case).

The parallel data signal output by MUX 8 is provided to byte deserializer and bypass MUX 9. The byte deserializer may operate to widen the parallel data signal to a multiple-byte width (and may be clocked by parallel clock signals output by MUX 3 and MUX 4). Bypass MUX 9 selects the parallel data signal either after or before byte deserialization (bypassing the byte deserializer in the latter case).

Finally, the parallel data signal output by MUX 9 is provided to the receiver first-in-first-out (RX FIFO) buffer. The RX FIFO buffer provides buffered received data to the core logic of the integrated circuit. If the integrated circuit is a programmable logic device (such as, for example, a field programmable gate array or FPGA), then the core logic may be the core programmable fabric of the PLD.

The transmitter PCS circuit receives a parallel data signal from the core logic and provides the parallel data signal to the transmitter (TX) FIFO buffer. The parallel data signal from the TX FIFO buffer is provided to the byte serializer and also to bypass MUX 12. The byte serializer may operate to narrow the parallel data signal to a single-byte width. Bypass MUX 12 selects the parallel data signal either after or before byte serialization (bypassing the byte serializer in the latter case).

The parallel data signal output from MUX 12 is provided to the 8 b/10 b encoder. The 8 b/10 b encoder maps 8-bit symbols to 10-bit symbols (and may be clocked by tx_clkout and a parallel clock signal provided by MUX 10, which selects either tx_clkout or the output of a clock divider). Other encoders may be used depending on the encoding system utilized. For example, 64 b/66 b encoder may be used. Bypass MUX 13 selects the parallel data signal either after or before encoding (bypassing the encoder in the latter case).

The parallel data signal output from MUX 13 is provided to the transmitter (TX) bit slip circuit, which is clocked by tx_clkout, and MUX 14. The TX bit slip circuit may compensate for loss or gain of a bit or bits due to variation in clock rates. Bypass MUX 14 selects one of: the parallel data signal from MUX 13, the parallel data signal from the TX bit slip circuit, a parallel data signal from the PRBS generator, and the parallel data signal from MUX 7 in the receiver PCs. The output of MUX 14 is provided to the serializer in the transmitter PMA circuit.

The serializer of the transmitter PMA circuit receives the parallel data signal from MUX 14 of the transmitter PCS circuit and also receives a serial clock signal and a parallel clock signal (tx_clkout) from the CGB. The serializer converts the parallel data signal to a serial data signal and outputs the serial data signal (tx_serial_data) to the serial communication channel and also outputs parallel and serial clock signals (tx_pma_div_clkout) to the core logic.

Figure 5:
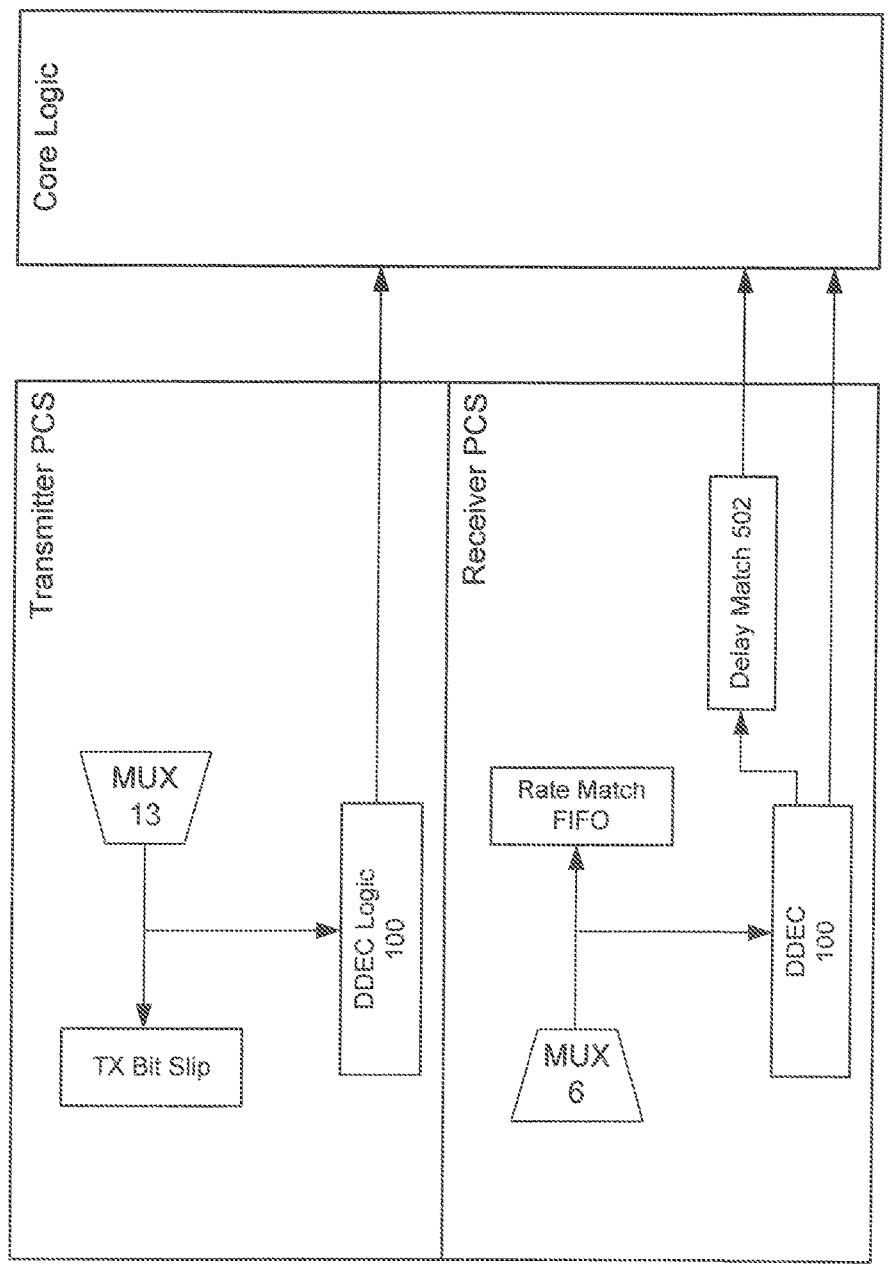
FIG. 5 depicts the incorporation of DDEC logic into the transmitter and receiver circuits of FIG. 4 in accordance with an embodiment of the invention.

FIG. 5 depicts the incorporation of DDEC logic into the transmitter and receiver circuits of FIG. 4 in accordance with an embodiment of the invention. As shown, the DDEC logic circuit 100 may be incorporated into the transmitter PCS circuit and/or the receiver PCS circuit.

In the transmitter PCS, the DDEC logic circuit 100 may tap into the parallel data bus from the bypass MUX 13 to the TX bit slip circuit. The output of this DDEC logic circuit 100 may be provided to the core logic of the integrated circuit.

In the receiver PCS, the DDEC logic circuit 100 may tap into the parallel data bus from the bypass MUX 6 to the rate match FIFO. The output of this DDEC logic circuit 100 may be provided to a delay match circuit 502, which provides its output to the core logic, and also directly to the core logic.

Note that FIG. 5 shows particular locations for the DDEC logic circuit to tap into the parallel data buses in the receiver and transmitter PCS circuits. However, other tap locations may be utilized, depending on the specific receiver and transmitter PCS circuits and the particular application for the data detection and event capture.

Figure 6:
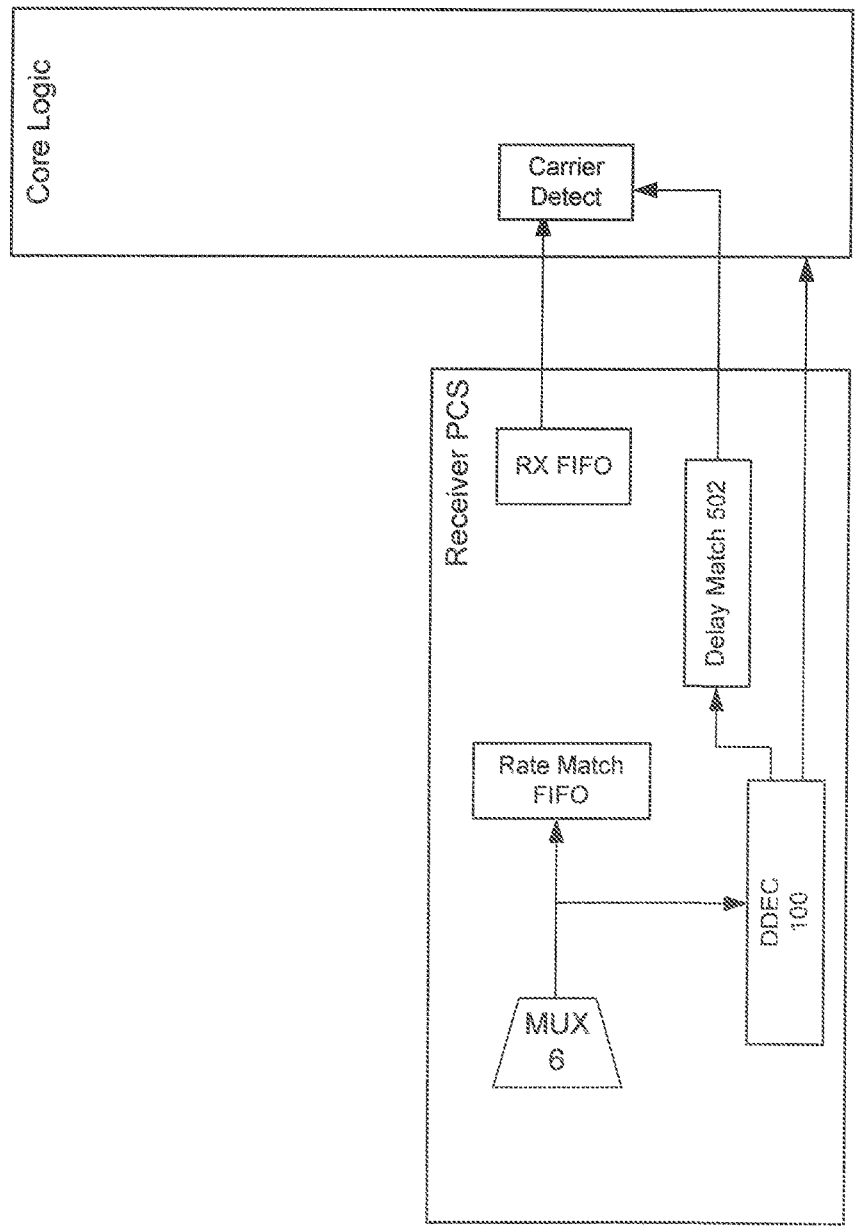
FIG. 6 depicts a receiver circuit that uses DDEC logic for carrier detection in accordance with an embodiment of the invention.

FIG. 6 depicts a receiver circuit that uses DDEC logic for carrier detection in accordance with an embodiment of the invention. Carrier detection (under Gigabit Ethernet, for example) using data output by the RX FIFO buffer in a conventional receiver PCS circuit is problematic due to the 10-bit information being lost in the 8 b/10 b decoder. A workaround may be accomplished using sideband signals or by moving the 8 b/10 b decoder to the core logic. However, a more robust and efficient solution may be achieved by incorporating the DDEC logic circuit in a receiver circuit as taught herein.

As shown in FIG. 6, the output from the delay match circuit 502 in the receiver PCS circuit may be provided to a carrier detect circuit in the core logic. Because the DDEC logic circuit 100 taps into a parallel data bus which is before the 8 b/10 b decoder in the receiver PCS, the required 10-bit information is present in the parallel data signal processed by the DDEC logic circuit 100 and so is effectively provided to the carrier detect circuit.

Figure 7:
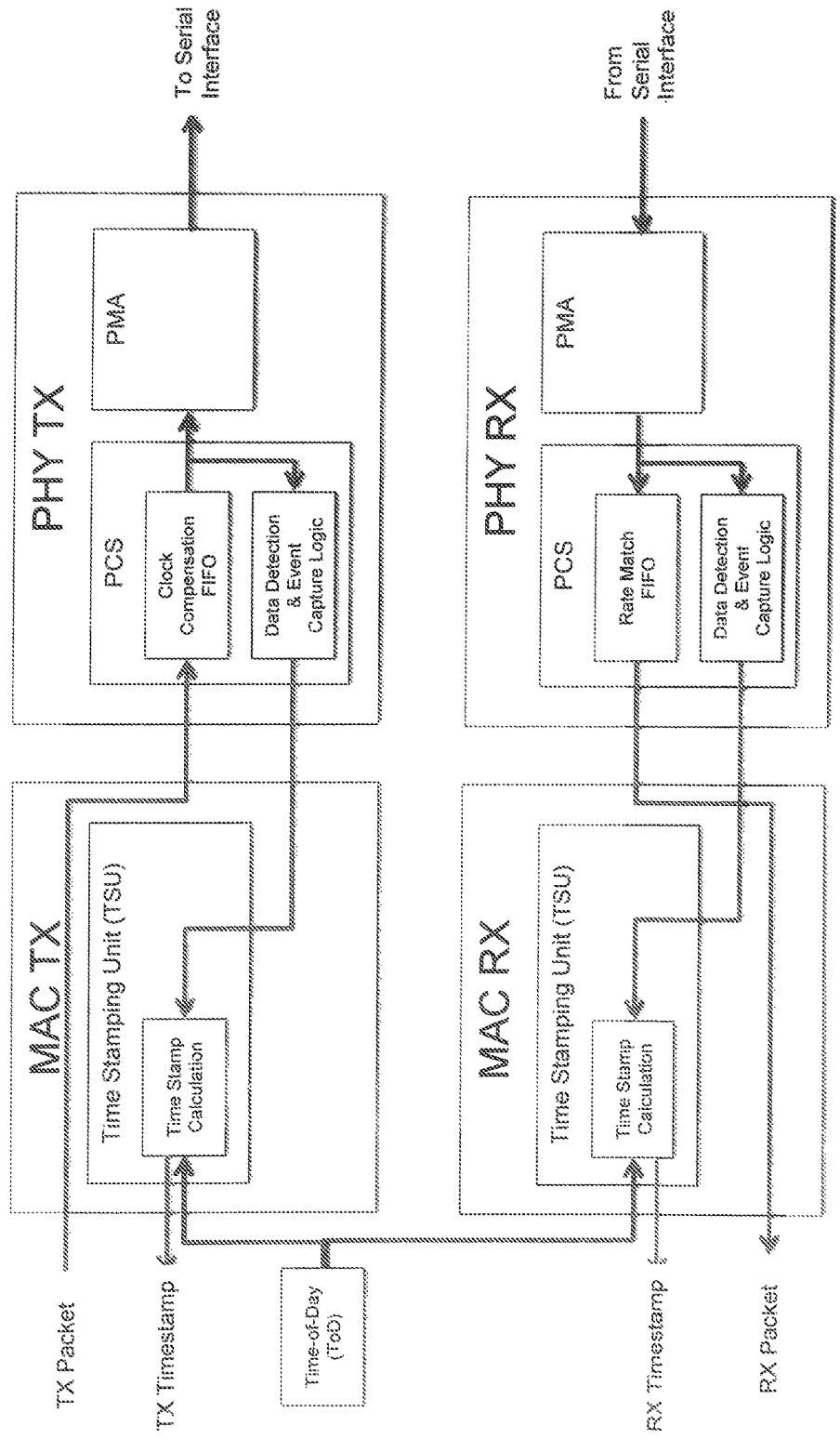
FIG. 7 depicts a transceiver circuit that uses DDEC logic for start-of-frame event capture in accordance with an embodiment of the invention.

FIG. 7 depicts a transceiver circuit that uses DDEC logic for start-of-frame event capture in accordance with an embodiment of the invention. Start-of-frame event capture with high accuracy is problematic due to limitations in existing techniques. However, a high accuracy solution may be achieved by incorporating the DDEC logic circuit in transmitter and receiver circuits as taught herein.

As depicted, the transceiver circuit includes media access control transmitter (MAC TX), physical layer transmitter (PHY TX), media access control receiver (MAC RX), and physical layer receiver (PHY RX) circuits. As further depicted, the TX PCS in the PHY TX receives the TX packet data from the MAC TX, and the RX PCS in the PHY RX provides the RX packet data to the MAC RX.

In the exemplary implementation that is depicted in FIG. 7, a first DDEC (Data Detection & Event Capture) logic circuit may tap into the parallel data bus at the output of the clock compensation FIFO in the TX PCS circuit in the PHY TX. In addition, a second DDEC logic circuit may tap into the parallel data bus at the input of rate match FIFO in the RX PCS circuit in the PHY RX.

The first DDEC logic circuit (in the TX PCS) may provide its output to TX time stamp calculation circuit in TX time stamping unit (TSU) in the MAC TX. The TX time stamp calculation circuit uses a time-of-day signal from Time-of-Day (ToD) circuit and the output of the first DDEC logic to generate a TX timestamp.

The second DDEC logic circuit (in the RX PCS) may provide its output to RX time stamp calculation circuit in RX time stamping unit (TSU) in the MAC RX. The RX time stamp calculation circuit uses the time-of-day signal from Time-of-Day (ToD) circuit and the output of the second DDEC logic to generate a RX timestamp.

The first DDEC logic circuit advantageously avoids latency variation in the TX clock compensation FIFO buffer (by tapping into a point between the TX clock compensation FIFO buffer and the serial interface). The second DDEC logic circuit advantageously avoids latency variation in the RX rate match FIFO buffer (by tapping into a point between the RX rate match FIFO buffer and the serial interface). This results in substantially improved accuracy in the time stamping.

Figure 8:
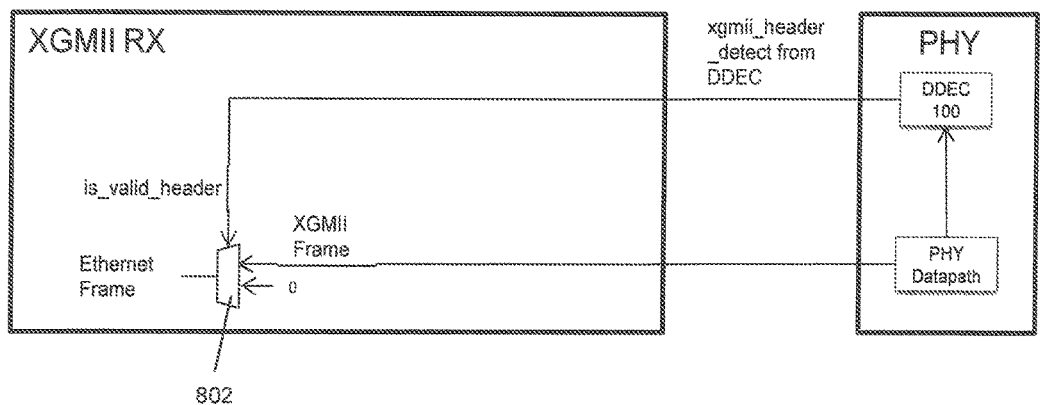
FIG. 8 depicts a receiver circuit that uses DDEC logic for valid frame header detection in accordance with an embodiment of the invention.

FIG. 8 depicts a receiver circuit that uses DDEC logic for valid frame header detection in accordance with an embodiment of the invention. In a receiver for 10 Gigabit Media Independent Interface (XGMII), an Ethernet frame is considered valid if a specific header sequence (START, <preamble>x6 times, SFD) is received.

As shown in FIG. 8, the DDEC logic circuit 100 may be used tap into the PHY datapath to detect the specific header sequence. The output indicating detection (xgmii_header_detect) may be output from the DDEC logic circuit 100 as an is_valid_header control signal to selector 802. When the is_valid_header control signal is asserted, then the selector 802 may output the XGMII frame as a valid Ethernet frame. Otherwise, when the is_valid_header control signal is not asserted, then the selector 802 may output a logical 0 data signal. Compared to a conventional solution, the structure in FIG. 8 reduces latency due to XGMII (for example, by two clock cycles in an exemplary implementation) and also reduces resources utilization of soft comparators and of registers (for example, eliminates the need for two 36-bit pipeline registers in an exemplary implementation).

Figure 9:
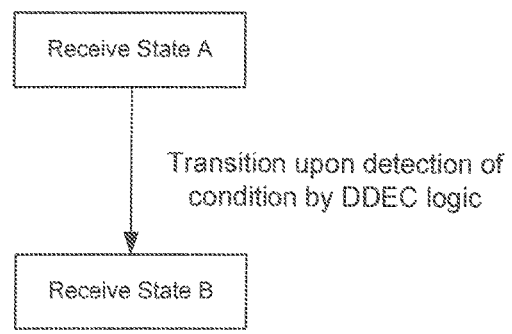
FIG. 9 depicts the use of DDEC logic to detect a condition for a receive state transition in accordance with an embodiment of the invention.

FIG. 9 depicts the use of DDEC logic to detect a condition for a receive state transition in accordance with an embodiment of the invention. An HSSI protocol (for example, Gigabit Ethernet) may have various receive states. Consider a transition from Receive State A to Receive State B. The transition may occur upon the occurrence of a specified condition. In accordance with an embodiment of the invention, the DDEC logic circuit is used to detect the specified condition that triggers the transition from Receive State A to Receive State B.

In a first exemplary implementation, the transition may be from WAIT_FOR_K state to the RX_K state in Gigabit Ethernet, as specified in IEEE 802.3 Clause 36. In a second exemplary implementation, the transition may be from the RX_K state to the RX_CB state in Gigabit Ethernet. In a third exemplary implementation, the transition may be from the RECEIVE state to one of the TRI+RRI, the TRR+EXTEND, or the EARLY_END_EXT states in Gigabit Ethernet. In a fourth exemplary implementation, the transition may be from the EPD2_CHECK_END state to one of the TRI+EXTEND or the PACKET_BURST_RRS states in Gigabit Ethernet. In a fifth exemplary implementation, the transition may be from the IDLE_D state to one of the IDLE_D (itself) or the RX_CB states in Gigabit Ethernet.

Figure 10:
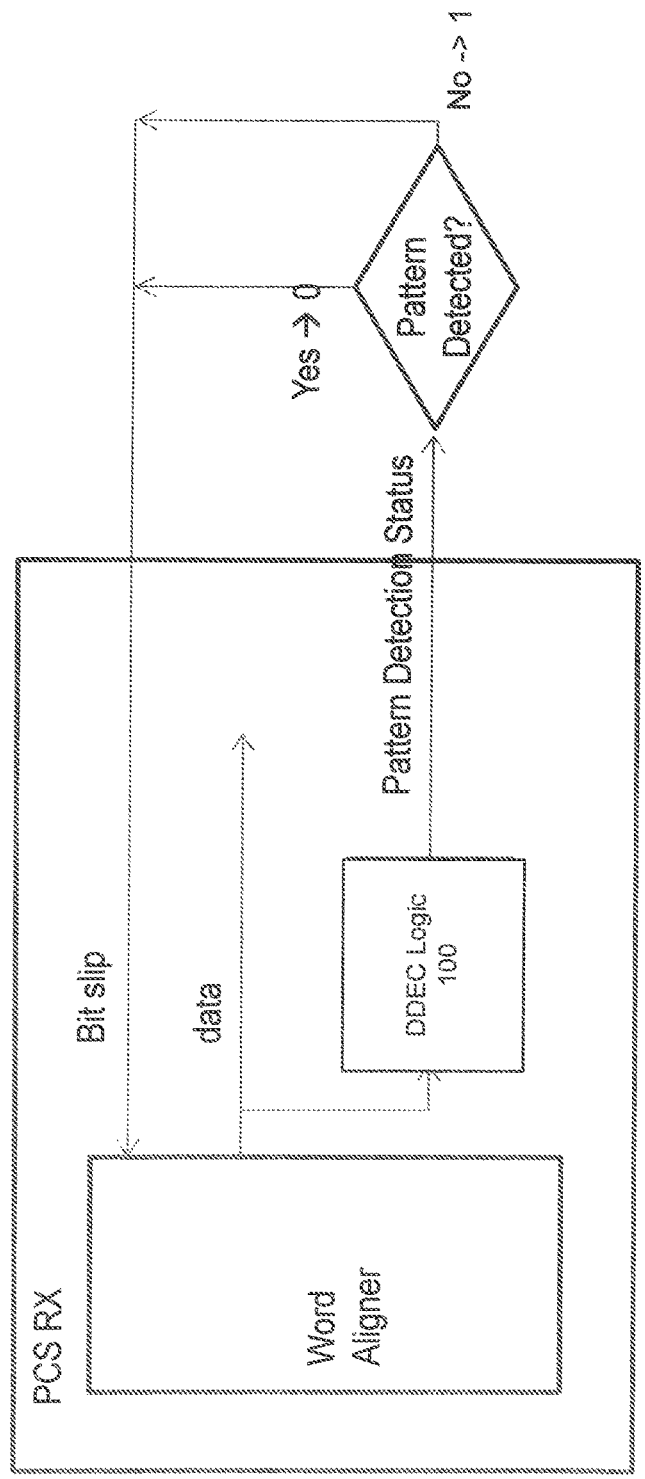
FIG. 10 depicts the use of DDEC logic circuit when a word aligner is configured in bit slip mode in accordance with an embodiment of the invention.

FIG. 10 depicts the use of DDEC logic circuit 100 when a word aligner is configured in bit slip mode in accordance with an embodiment of the invention. When the word aligner in the PCS RX circuit is configured in bit slip mode, the DDEC logic circuit 100 may receive the output of the word aligner and used for pattern detection. If the pattern detection status indicates yes (the pattern is detected), then a value of logical 0 (indicating no bit slip) may be provided as the bit slip signal to the word aligner. On the other hand, If the pattern detection status indicates no (the pattern is not detected), then a value of logical 1 (indicating a bit slip) may be provided as the bit slip signal to the word aligner.

Figure 11:
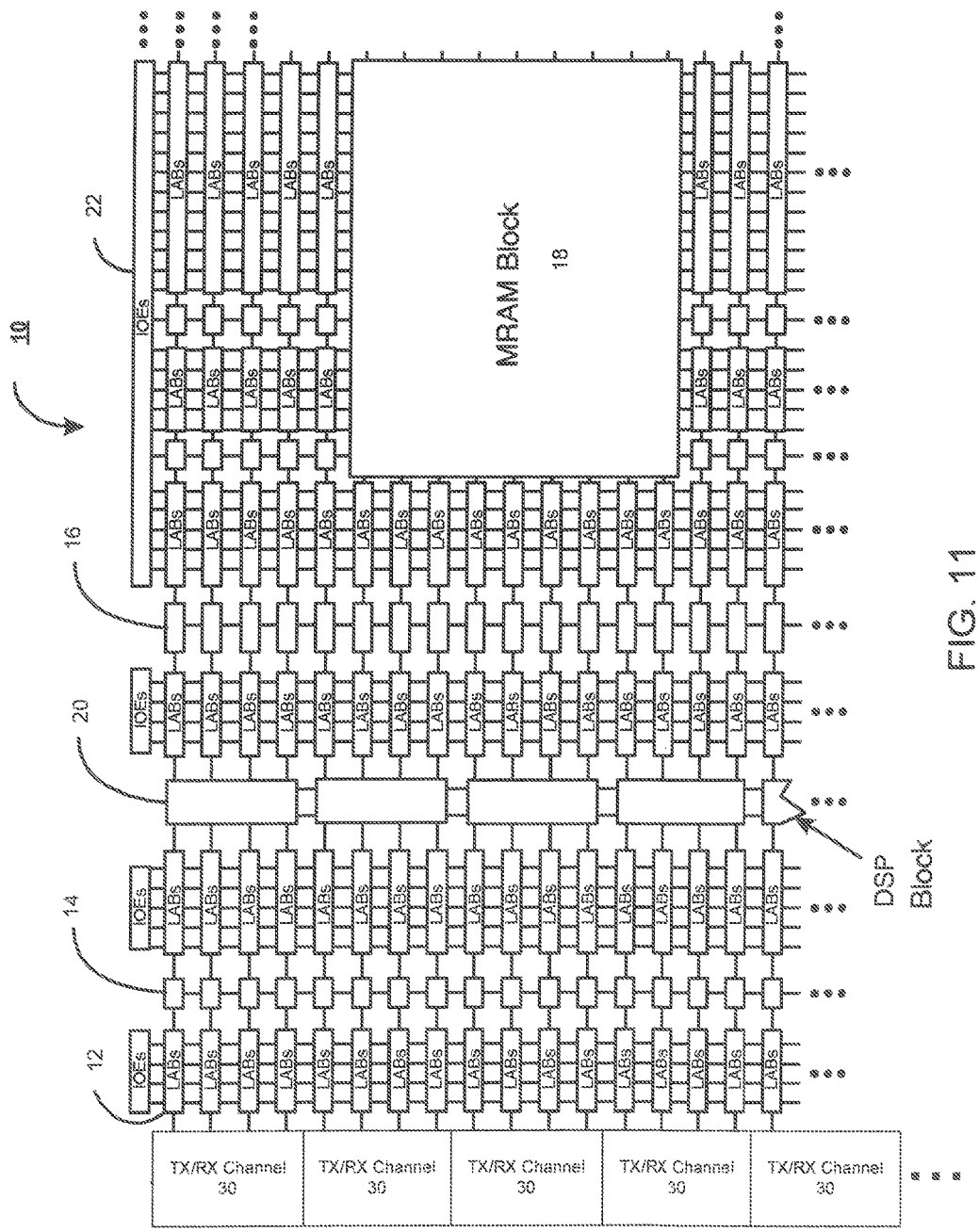
FIG. 11 is a simplified partial block diagram of a field programmable gate array (FPGA) that can include aspects of the present invention.

FIG. 11 is a simplified partial block diagram of a field programmable gate array (FPGA) 10 that can include aspects of the present invention. It should be understood that embodiments of the present invention can be used in numerous types of integrated circuits such as field programmable gate arrays (FPGAs), programmable logic devices (PLDs), complex programmable logic devices (CPLDs), programmable logic arrays (PLAs), digital signal processors (DSPs) and application specific integrated circuits (ASICs).

FPGA 10 includes within its "core" a two-dimensional array of programmable logic array blocks (or LABs) 12 that are interconnected by a network of column and row interconnect conductors of varying length and speed. LABs 12 include multiple (e.g., ten) logic elements (or LEs).

An LE is a programmable logic block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 10 may also include a distributed memory structure including random access memory (RAM) blocks of varying sizes provided throughout the array. The RAM blocks include, for example, blocks 14, blocks 16, and block 18. These memory blocks can also include shift registers and FIFO buffers.

FPGA 10 may further include digital signal processing (DSP) blocks 20 that can implement, for example, multipliers with add or subtract features. Input/output elements (IOEs) 22 located, in this example, around the periphery of the chip support numerous single-ended and differential input/output standards. Each IOE 22 is coupled to an external terminal (i.e., a pin) of FPGA 10. A transceiver (TX/RX) channel array may be arranged as shown, for example, with each TX/RX channel circuit 30 being coupled to several LABs. A TX/RX channel circuit 30 may include, among other circuitry, the DDEC logic circuitry described herein. It is to be understood that FPGA 10 is described herein for illustrative purposes only and that the present invention can be implemented in many different types of PLDs, FPGAs, and ASICs.

Figure 12:
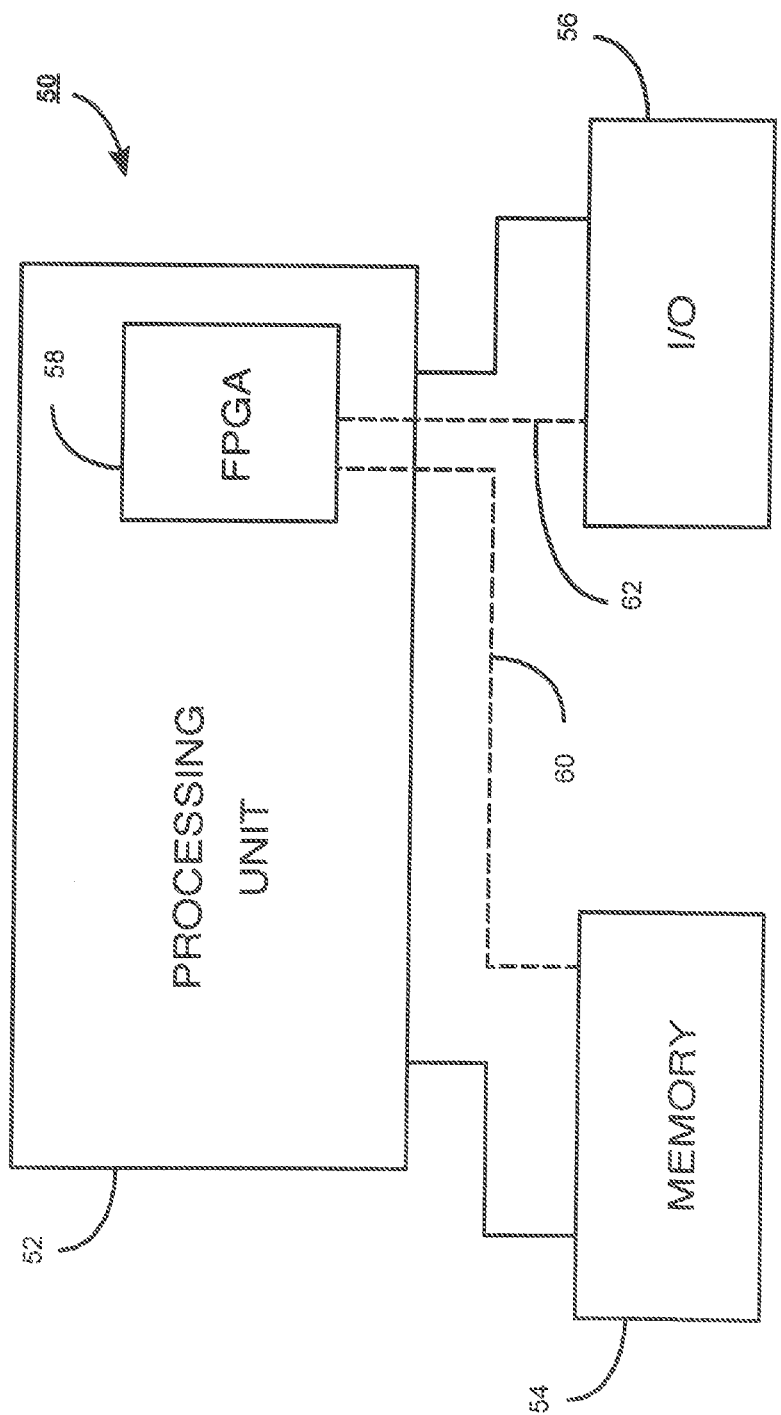
FIG. 12 is a block diagram of an exemplary digital system that can employ techniques of the present invention.

FIG. 12 shows a block diagram of an exemplary digital system 50 that can embody techniques of the present invention. System 50 may be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 50 may be provided on a single board, on multiple boards, or within multiple enclosures.

System 50 includes a processing unit 52, a memory unit 54, and an input/output (I/O) unit 56 interconnected together by one or more buses. According to this exemplary embodiment, FPGA 58 is embedded in processing unit 52. FPGA 58 can serve many different purposes within the system 50. FPGA 58 can, for example, be a logical building block of processing unit 52, supporting its internal and external operations. FPGA 58 is programmed to implement the logical functions necessary to carry on its particular role in system operation. FPGA 58 can be specially coupled to memory 54 through connection 60 and to I/O unit 56 through connection 62.

Processing unit 52 may direct data to an appropriate system component for processing or storage, execute a program stored in memory 54, receive and transmit data via I/O unit 56, or other similar function. Processing unit 52 may be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 58 may control the logical operations of the system. As another example, FPGA 58 acts as a reconfigurable processor that may be reprogrammed as needed to handle a particular computing task. Alternately, FPGA 58 may itself include an embedded microprocessor. Memory unit 54 may be a random access memory (RAM), read only memory (ROM), fixed or flexible disk media, flash memory, tape, or any other storage means, or any combination of these storage means.

CONCLUSION

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. A data detection and event capture circuit comprising:
   data comparator logic that receives a monitored data word from a parallel data bus, and generates a plurality of pattern detected signals;
   a pattern detection logic that receives the plurality of pattern detected signals from the data comparator logic and generates a plurality of any pattern detected signals, wherein each any pattern detected signal indicates whether any pattern of a corresponding set of patterns is detected; and
   sequence detection logic that receives the plurality of pattern detected signals from the data comparator logic and generates a plurality of sequence detected signals, wherein each sequence detected signal indicates whether any pattern sequence of a corresponding set of pattern sequences is detected.

2. The data detection and event capture circuit of claim 1, wherein the data comparator logic comprises:
   a plurality of configurable data registers;
   a plurality of configurable mask registers; and
   a plurality of comparator circuits, each comparator circuit receiving a configured data word from a configurable data register, a mask word from a mask register, and the monitored data word from the parallel data bus and outputting a pattern detected signal.

3. The data detection and event capture circuit of claim 2, wherein each comparator circuit compares bits of the monitored data word against bits of the configured data word for those bits indicated by the mask word and asserts the pattern detected signal when a match is found.

4. The data detection and event capture circuit of claim 1, wherein the pattern detection logic comprises:
   a plurality of mask logic circuits, each mask logic circuit receiving the plurality of pattern detected signals and outputting masked pattern detected signals; and
   a plurality of OR logic circuits, each OR logic circuit receiving the plurality of masked pattern detected signals from a corresponding mask logic circuit and asserting an any pattern detected signal if at least one of the masked pattern detected signals is asserted.

5. The data detection and event capture circuit of claim 4, wherein a logical zero is output for a pattern detected signal blocked by a mask logic circuit in the pattern detection logic.

6. The data detection and event capture circuit of claim 1, wherein the sequence detection logic comprises:
   a plurality of delay circuits which receives the plurality of pattern detected signals and outputs a plurality of delayed pattern detected signals;
   a plurality of mask logic circuits, each mask logic circuit receiving the plurality of delayed pattern detected signals and outputting a plurality of masked delayed pattern detected signals; and
   a plurality of AND logic circuits, each AND logic circuit receiving the plurality of masked delayed pattern detected signals from a corresponding mask logic circuit and asserting a sequence detected signal if all of the masked delayed pattern detected signals are asserted.

7. The data detection and event capture circuit of claim 6, wherein a logical one is output for a delayed pattern detected signal blocked by a mask logic circuit in the sequence detection logic.

8. The data detection and event capture circuit of claim 1, wherein the parallel data bus comprises an input bus for a bit slip circuit in a transmitter circuit.

9. The data detection and event capture circuit of claim 1, wherein the parallel data bus comprises an input bus for a rate match first-in-first-out buffer in a receiver circuit.

10. The data detection and event capture circuit of claim 9, wherein outputs of the data detection and event capture circuit are provided to a delay match circuit, and outputs of the delay match circuit are provided to a carrier detect circuit.

11. The data detection and event capture circuit of claim 1, wherein the parallel data bus comprises an output bus for a clock compensation first-in-first-out buffer in a physical layer transmitter circuit, and wherein outputs of the data detection and event capture circuit are provided to a time stamping unit in a media access control transmitter circuit.

12. The data detection and event capture circuit of claim 1, wherein the parallel data bus comprises an input bus for a rate match first-in-first-out buffer in a physical layer receiver circuit, and wherein outputs of the data detection and event capture circuit are provided to a time stamping unit in a media access control receiver circuit.

13. The data detection and event capture circuit of claim 1, wherein an output of the data detection and event capture circuit indicates whether a valid header of a frame is detected.

14. The data detection and event capture circuit of claim 1, wherein an output of the data detection and event capture circuit triggers a transition from a first receive state to a second receive state of a receiver circuit.

15. A method of data detection and event capture, the method comprising:
   receiving a monitored data word from a parallel data bus;
   applying data comparator logic to the monitored data word to generate a plurality of pattern detected signals;
   applying a pattern detection logic to the plurality of pattern detected signals to generate a plurality of any pattern detected signals, wherein each any pattern detected signal indicates whether any pattern of a corresponding set of patterns is detected; and
   applying sequence detection logic to the plurality of pattern detected signals to generate a plurality of sequence detected signals, wherein each sequence detected signal indicates whether any pattern sequence of a corresponding set of pattern sequences is detected.

16. The method 15, wherein the data comparator logic includes a plurality of comparator circuits, wherein each comparator circuit receives a configured data word from a configurable data register, a mask word from a mask register, and the monitored data word from the parallel data bus, and wherein each comparator circuit outputs a pattern detected signal.

17. The method of claim 16, wherein each comparator circuit compares bits of the monitored data word against bits of the configured data word for those bits indicated by the mask word and asserts the pattern detected signal when a match is found.

18. The method of claim 15, wherein the any pattern detection logic includes a plurality of mask logic circuits and a plurality of OR logic circuits, wherein each mask logic circuit receiving the plurality of pattern detected signals and outputting masked pattern detected signals, and wherein each OR logic circuit receiving the plurality of masked pattern detected signals from a corresponding mask logic circuit and asserting an any pattern detected signal if at least one of the masked pattern detected signals is asserted.

19. The method of claim 15, wherein the sequence detection logic includes a plurality of delay circuits and a plurality of mask logic circuits, and a plurality of AND logic circuits, wherein the plurality of delay circuits receives the plurality of pattern detected signals and outputs a plurality of delayed pattern detected signals, wherein each mask logic circuit receives the plurality of delayed pattern detected signals and outputs a plurality of masked delayed pattern detected signals, and wherein each AND logic circuit receives the plurality of masked delayed pattern detected signals from a corresponding mask logic circuit and asserts a sequence detected signal if all of the masked delayed pattern detected signals are asserted.

\* \* \* \* \*